(12) United States Patent
She et al.

(10) Patent No.: US 12,320,975 B2
(45) Date of Patent: Jun. 3, 2025

(54) IMAGE DETECTION METHOD, NON-TRANSITORY COMPUTER-READABLE STORAGE MEDIUM AND VEHICLE

(71) Applicant: NEUSOFT CORPORATION, Liaoning (CN)

(72) Inventors: Minggang She, Liaoning (CN); Xin Zhang, Liaoning (CN); Peng Yu, Liaoning (CN); Wenyan Mu, Liaoning (CN)

(73) Assignee: NEUSOFT CORPORATION, Shenyang (CN)

( * ) Notice: Subject to any disclaimer, the term of this patent is extended or adjusted under 35 U.S.C. 154(b) by 0 days.

(21) Appl. No.: 18/380,326

(22) Filed: Oct. 16, 2023

(65) Prior Publication Data
US 2025/0123484 A1 Apr. 17, 2025

(51) Int. Cl.
G02B 27/01 (2006.01)
G06T 7/00 (2017.01)
G06T 7/11 (2017.01)
G06V 10/75 (2022.01)

(52) U.S. Cl.
CPC ........ *G02B 27/0101* (2013.01); *G06T 7/0002* (2013.01); *G06T 7/11* (2017.01); *G06V 10/751* (2022.01)

(58) Field of Classification Search
CPC .. G02B 27/0101; G02B 27/18; G06V 10/751; G06T 7/11; G06T 7/0002
See application file for complete search history.

(56) References Cited

U.S. PATENT DOCUMENTS

2012/0026315 A1* 2/2012 Lee .................. G09G 3/006 348/125
2016/0313562 A1* 10/2016 Saisho .................. G09G 5/006

* cited by examiner

*Primary Examiner* — Lisa S Landis
(74) *Attorney, Agent, or Firm* — MYERS WOLIN, LLC

(57) ABSTRACT

The disclosure relates to an image detection method, a readable storage medium and a vehicle. The method includes: obtaining a to-be-detected image; determining related information of a target image in the to-be-detected image, where the target image is an image capable of being projected onto a vehicle windshield for display through a projection device; and determining whether the to-be-detected image is an abnormal image according to the related information of the target image.

17 Claims, 7 Drawing Sheets

IMAGE DETECTION METHOD, NON-TRANSITORY COMPUTER-READABLE STORAGE MEDIUM AND VEHICLE

CROSS-REFERENCE TO RELATED APPLICATION

The contents of Chinese Patent Application No. 202210846155.1, filed on Jul. 4, 2022, are herein incorporated by reference.

BACKGROUND

A head up display (HUD) is a display apparatus for projecting and displaying an image to a field of view in front of a driver, which projects and displays information (such as a vehicle speed, a navigation route, the amount of remaining oil and other information) related to vehicle driving onto a windshield of a vehicle in a mode of a two-dimensional image by using a principle of an optical reflection so that the driver can see a virtual image on the windshield when looking ahead through the windshield.

SUMMARY

The disclosure relates to the technical field of vehicles, in particular to an image detection method, a readable storage medium and a vehicle.

An image detection method is provided by a first aspect of the disclosure, including:
  obtaining a to-be-detected image;
  determining related information of a target image in the to-be-detected image, where the target image is an image capable of being projected onto a vehicle windshield for display through a projection device; and
  determining whether the to-be-detected image is an abnormal image according to the related information of the target image.

A non-transitory computer-readable storage medium is provided by a second aspect of the disclosure, storing a computer program, when the computer program are executed by a processor, the processor is caused to:
  obtain a to-be-detected image;
  determine related information of a target image in the to-be-detected image, where the target image is an image capable of being projected onto a vehicle windshield for display through a projection device; and
  determine whether the to-be-detected image is an abnormal image according to the related information of the target image.

A vehicle is provided by a third aspect of the disclosure, including:
  a projection device, configured to project a to-be-detected image onto a vehicle windshield;
  a processor;
  a memory for storing executable instructions of the processor; and
  the processor is configured to:
  obtain a to-be-detected image;
  determine related information of a target image in the to-be-detected image, where the target image is an image capable of being projected onto a vehicle windshield for display through a projection device; and
  determine whether the to-be-detected image is an abnormal image according to the related information of the target image.

Other features and advantages of the disclosure will be described in detail in the following detailed description.

BRIEF DESCRIPTION OF THE DRAWINGS

Accompanying drawings are for providing further understanding of the disclosure, constitute a part of the specification and together with the following detailed description, serve to explain the disclosure without constituting the limitation on the disclosure. In the accompanying drawings.

DETAILED DESCRIPTION

Implementations of the disclosure are described in detail below with reference to accompanying drawings. It is to be understood that implementations described here are used to describe and explain the disclosure instead of limiting the disclosure.

It needs to be noted that in the disclosure, all actions of obtaining signals, information or data (for example, a to-be-detected image, interface design template information, an interface design template library and the like) are performed in accordance with corresponding data protection regulations and policies in a country and with permission of an owner of the corresponding apparatus.

Compared with a conventional way that the vehicle driver needs to look down to check a dash board and a central control screen, the driver does need to look down when checking related information of vehicle driving, the driver avoids switching his visual line between an image and a road surface, time of crisis response is shortened, and driving safety is improved.

The related information of vehicle driving is projected onto the vehicle windshield for display through the projection device, so that traffic accidents caused when a driver frequently looks down to check a dash board and a central control screen may be effectively avoided. However, the related information of vehicle driving, which is displayed on the windshield, may block a visual line of the driver for checking a road condition in front to a certain degree, in other words, when a region for the related information of vehicle driving, which is displayed on the windshield, is large, the driver may fail in clearly checking road information in front of vehicle driving, or when a content actually displayed on a certain region of the windshield is inconsistent with interface layout information, the driver may see wrong information, which leads to occurrence of traffic accidents. Thus, if the image projected onto the vehicle windshield for display is abnormal, safe driving of the driver may be affected.

In view of this, the disclosure provides an image detection method, a readable storage medium and a vehicle, so as to guarantee that an image projected onto the vehicle windshield does not affect driver driving, and thus driving safety is improved.

Figure 1:
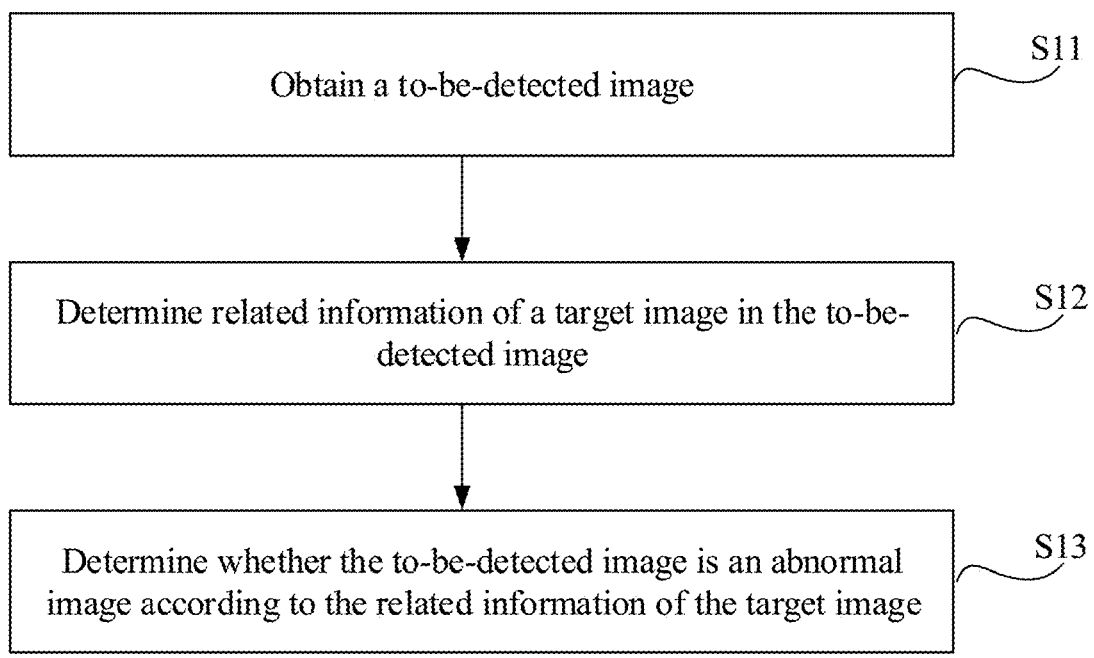
FIG. 1 is a flowchart of an image detection method shown according to an example.

FIG. 1 is a flowchart of an image detection method shown according to an example. The method may be performed by an electronic device with processing capability, for example, an in-vehicle processor, a controller and the like, or the method may also be performed by a server communicating with a vehicle remotely. As shown in FIG. 1, the method may include the following steps.

In step S11, a to-be-detected image is obtained.

First, it is to be understood that an image may be detected before or after or while the image is projected onto a vehicle windshield, which is not limited in the disclosure.

In the disclosure, a to-be-detected image may be an image outputted by a projection device, the projection device may be a head up display (HUD), an augmented reality head up display (AR-HUD), a combiner head up display (C-HUD), a windshield head up display (W-HUD), or the like, which is not limited in the disclosure.

In a possible example, the implementation for obtaining the to-be-detected image is: obtaining the to-be-detected image from the projection device in a case that the projection device is not abnormal.

In this example, before the to-be-detected image is obtained, the projection device for outputting the to-be-detected image is monitored, so as to determine whether the projection device is abnormal, and in a case that the projection device is not abnormal, the to-be-detected image is obtained from the projection device in response to receiving an image detection request inputted by a user. For example, in a case that the projection device is not abnormal, the to-be-detected image may be obtained from the projection device by using a shared memory or data coding transmission and other technologies.

In this example, given that the projection device is abnormal, the image outputted by the projection device is usually abnormal as well, and in order to avoid unnecessary workload generated by detecting the abnormal image outputted by the abnormal projection device, in this example, the to-be-detected image outputted by the abnormal projection device may be directly determined as the abnormal image, so detection workload is effectively reduced. Besides, by monitoring whether the projection device is abnormal, the to-be-detected image outputted by the projection device may be fast recognized as the abnormal image in a case that the projection device is abnormal. The projection device being abnormal may include that the projection device does not output the to-be-detected image according to a preset frequency, a communication function of the projection device is abnormal, and the like.

Besides, in a case that the projection device is abnormal, at least one of the following operations may be further executed: controlling a self-check system to self-check the projection device, restarting the projection device, outputting abnormal prompt information, and the like.

In step S12, the related information of the target image in the to-be-detected image is determined. The target image is an image capable of being projected onto a vehicle windshield for display through a projection device.

In step S13, whether the to-be-detected image is the abnormal image is determined according to the related information of the target image.

By means of the above technical solutions, the related information of the target image in the to-be-detected image is determined, where the target image is the image capable of being projected onto the vehicle windshield for display through the projection device, whether the to-be-detected image is the abnormal image is determined according to the related information of the target image, thus, whether the to-be-detected image is the abnormal image is determined according to the related information of the image which is capable of being projected onto the vehicle windshield for display through the projection device, and reliability of detecting the to-be-detected image is improved. Besides, whether the image is projected onto the vehicle windshield for display is determined subsequently according to a detection result of the to-be-detected image, it may be guaranteed that the image projected onto the vehicle windshield does not affect driving of a driver, and thus driving safety is improved.

In order to make those skilled in the art better understand the image detection method provided by the disclosure, the image detection method is described in detail below by using an integral example.

In the disclosure, the related information of the target image refers to: related information capable of representing that the target image may interfere with safe driving of the driver when the target image is projected onto the vehicle windshield for display. During actual application, given that a region for the related information of vehicle driving, which is displayed on the windshield, is large, or when a content actually displayed on a certain region of the windshield is inconsistent with the interface layout information, occurrence of traffic accidents may be caused, thus the related information of the target image in step S12 may include at least one of the following: a first proportion for which the target image accounts in a non-sketch region of the to-be-detected image, a second proportion for which the target image accounts in the to-be-detected image, and a matching result of each sub-image in the target image and interface design template information corresponding to the sub-image.

It is to be understood that a projection principle of a head up display (HUD) is: a light-emitting apparatus projects an image, a black image (an image composed of black pixel dots) does not emit light in an HUD light-emitting apparatus, namely, there is no projection, so the black image cannot be projected onto the windshield in the HUD, then black may be considered as a safety color, and non-black is a non-safety color which affects safe driving of the driver. Thus, in the disclosure, the target image may be an image composed of non-black pixel dots.

For example, in a first example, the related information of the target image includes the first proportion for which the target image accounts in the non-sketch region of the to-be-detected image. It is to be understood that user interface layout information of the projection device may be defined in a design stage of the projection device. The user interface layout information includes a pre-defined region for displaying the related information of vehicle driving, the related information of vehicle driving correspondingly displayed on each display region in this region, and the like. Thus, a user interface may be divided into a sketch region and the non-sketch region according to the user interface layout information of the projection device. The sketch region is a region in the user interface for displaying the related information of vehicle driving, the non-sketch region is a region in the user interface for not displaying the related information of vehicle driving, in other words, in a normal case, the target image is displayed in the sketch region and does not appear in the non-sketch region.

Theoretically, when the image is not abnormal, a non-black pixel dot does not exist in the non-sketch region, so in this example, whether the to-be-detected image is abnormal may be determined according to whether the non-black pixel dot exists in the non-sketch region. For example, a implementation of the above step S12 may be: M first pixel dots are selected in the non-sketch region of the to-be-detected image, where the M first pixel dots are distributed uniformly; and if the non-black pixel dot exists in the M first pixel dots, the first proportion P1 for which the target image accounts in the non-sketch region of the to-be-detected image is determined.

In the disclosure, in order to guarantee that the selected M first pixel dots can reflect distribution of pixel dots in the non-sketch region of the to-be-detected image, the selected M pixel dots are uniformly distributed in the non-sketch region of the to-be-detected image.

A ratio of the number of non-black pixel dots in the M first pixel dots to M is used as the first proportion P1, when the first proportion P1 is not 0, it indicates that the non-black pixel dot exits in the non-sketch region, and when the first proportion P1 is 0, it indicates that no non-black pixel dot exists in the non-sketch region. In other words, when the first proportion P1 is not 0, the to-be-detected image is determined as the abnormal image, so that fast check of the to-be-detected image may be implemented, and the image being abnormal is fed back.

Figure 2:
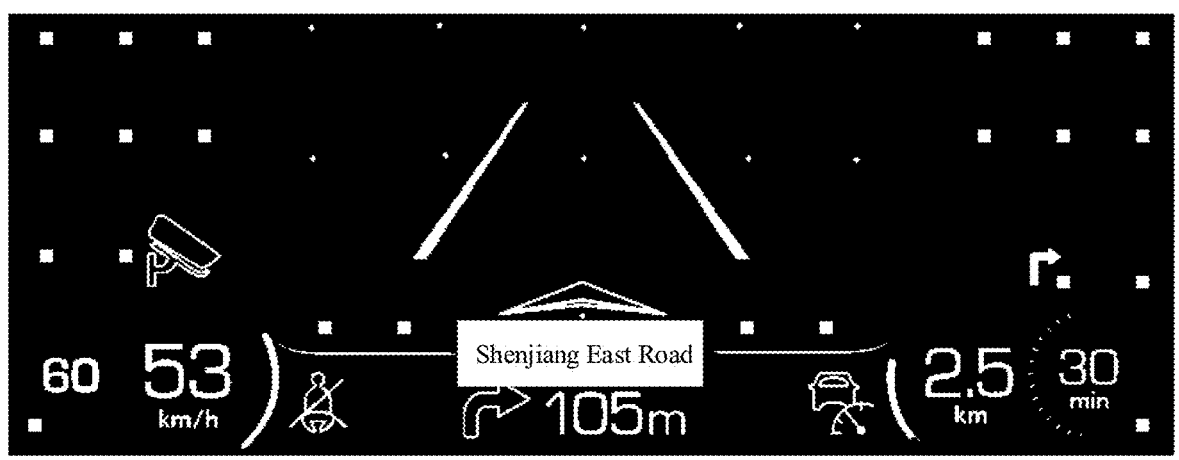
FIG. 2 is a schematic diagram of a to-be-detected image according to an example.

For example, FIG. 2 is a schematic diagram of a to-be-detected image shown according to an example. As shown in FIG. 2, the related information of vehicle driving may include an icon for indicating whether a camera exits on a current road, a current speed-limiting numerical value, an icon for indicating whether a safety belt is tied up, a navigation path, a self-adaptive cruise icon, a remaining distance of a route and an expected driving duration. In FIG. 2, rectangular dots in the to-be-detected image represent selected M first pixel dots.

After the first pixel dots are selected, color information of each first pixel dot is sampled, and whether a pixel dot with a non-black color exists in the first pixel dots is determined according to the color information. As the first pixel dots are all located in the non-sketch region, if layout of the to-be-detected image is consistent with layout represented by user interface layout information, no non-black pixel dot exists in the first pixel dots, namely, the first proportion P1 is 0, if the non-black pixel dot exists in the first pixel dots, the first proportion P1 is not 0, it indicates that the layout of the to-be-detected image outputted by the projection device is inconsistent with the layout represented by the user interface layout information, namely, the to-be-detected image is determined as the abnormal image.

In addition, given that the greater an area of the target image in the to-be-detected image is, the greater an area of the image projected and displayed onto the vehicle windshield is, correspondingly, the smaller a region of a road condition in front observed by the driver is, and the more easily the occurrence of the traffic accidents is caused. Thus, in the disclosure, in a second example, the to-be-detected image may further be detected according to the second proportion for which the target image accounts in the to-be-detected image.

In a possible way of this example, the related information of the target image includes the second proportion for which the target image accounts in the to-be-detected image. For example, first, L third pixel dots are selected in the to-be-detected image, and the L third pixel dots are uniformly distributed in the sketch region and the non-sketch region in the to-be-detected image. Then, the number m of non-black pixel dots in the L third pixel dots is determined. Finally, through a formula: P2=(m/L)*100%, the second proportion for which the target image accounts in the to-be-detected image is determined, and whether the to-be-detected image is the abnormal image is detected according to the second proportion.

During detection of the to-be-detected image in this way, a case that the non-black pixel dot exists in the non-sketch region and the second proportion is less than a preset numerical value may exist, namely, the abnormal image may be detected as a normal image in this way, and thus accuracy of image detection is lower. Thus, in another possible way of this example, in a case that it is determined that no non-black pixel dot exists in the non-sketch region, the second proportion for which the target image accounts in the to-be-detected image may be further determined. In other words, in a case that no non-black pixel dot exists in the M first pixel dots and the related information further includes the second proportion, whether the to-be-detected image is the abnormal image may be determined according to the second proportion. Correspondingly, a implementation of the above step S12 may be: the N second pixel dots are selected in the sketch region of the to-be-detected image, where the N second pixel dots are distributed uniformly; the number n of the non-black pixel dots is determined in the N second pixel dots; and the second proportion P2 for which the target image accounts in the to-be-detected image is determined through a following formula: P2=n/(M+N)*100%. Whether the non-black pixel dot exists in the non-sketch region may be determined in a way described in the first example, which is not repeated here.

For example, first, in a case that no non-black pixel dot exists in the M first pixel dots, namely, the first proportion P1 is 0, the N second pixel dots are selected in the sketch region of the to-be-detected image, and a color of each second pixel dot is determined. Similarly, in order to improve accuracy of the determined second proportion for which the target image accounts in the to-be-detected image, in one way, the selected N second pixel dots are distributed uniformly in the sketch region of the to-be-detected image. For example, as shown in FIG. 2, round dots represent the N second pixel dots selected uniformly in the to-be-detected image.

Then, the number n of non-black pixel dots in the N second pixel dots is determined. As the selected N second pixel dots are distributed uniformly in the sketch region of the to-be-detected image, the non-black pixel dot exists in the second pixel dot.

Finally, the second proportion P2 for which the target image accounts in the to-be-detected image is determined through the formula: P2=n/(M+N)*100%.

By means of the above technical solutions, all pixel dots in the to-be-detected image do not need to be traversed, the second proportion for which the target image accounts in the to-be-detected image may be fast determined, and image detection efficiency is improved.

Besides, the second proportion P2 for which the target image accounts in the to-be-detected image may also be determined through the following way: first, binarization processing is performed on the to-be-detected image to generate a binary image. During binarization processing, a gray value of the non-black pixel dot is set as 1, a gray value of a black pixel dot is set as 0, and thus the gray values of the pixel dots in the generated binary image are 0 or 1 respectively. Then, a ratio of a region with the gray value being 1 to a whole image region is determined in the binary image. For example, a ratio of the number of pixel dots with the gray values being 1 in the image to the number of all pixel dots in the binary image is determined and determined as the second proportion for which the target image accounts in the to-be-detected image.

In this way, all the pixel dots in the to-be-detected image need to be analyzed to generate the binary image, the number of pixel dots with the gray values being 1 and the number of all the pixel dots in the binary image are determined, namely, all the pixel dots in the to-be-detected image need to be traversed, analysis workload is large, but, accuracy of the determined second proportion is high. It is to be understood that during actual application, the second proportion for which the target image accounts in the to-be-detected image may be determined in different ways according to demands, which is not limited in the disclosure.

After the second proportion for which the target image accounts in the to-be-detected image is determined according to any one of above ways, whether the to-be-detected image is the abnormal image may be determined according to the second proportion. For example, a implementation of the above step S13 may be: the to-be-detected image is determined as the normal image when the second proportion is less than or equal to a preset numerical value; and the to-be-detected image is determined as the abnormal image when the second proportion is greater than the preset numerical value.

In the disclosure, in a case that the to-be-detected image is determined as the abnormal image, an abnormal level of the to-be-detected image may be further divided according to a size of the second proportion. The greater the second proportion is, the higher the corresponding abnormal level of the to-be-detected image is, namely, the greater an abnormal degree of the to-be-detected image is.

For example, the preset numerical value is 30%, when the second proportion is greater than 30% and less than or equal to 50%, the abnormal level of the to-be-detected image is determined as a first level; when the second proportion is greater than 50% and less than or equal to 80%, the abnormal level of the to-be-detected image is determined as a second level; and when the second proportion is greater than 80%, the abnormal level of the to-be-detected image is determined as a third level. An abnormal degree of the first level is less than an abnormal degree of the second level, and the abnormal degree of the second level is less than an abnormal degree of the third level. For example, the abnormal degree of the first level may be "ordinarily abnormal", the abnormal degree of the second level may be "seriously abnormal", and the abnormal degree of the third level may be "fatally abnormal", etc.

Besides, in a case that the to-be-detected image is determined as the abnormal image, the projection device may be further inhibited from projecting the image outputted by the projection device onto a vehicle windshield for display, so as to improve driving safety.

By using the above technical solutions, whether the to-be-detected image is the abnormal image is detected according to the second proportion for which the target image accounts in the to-be-detected image, whether the image is projected onto the vehicle windshield for display is determined subsequently according to a detection result of the to-be-detected image, it may be guaranteed that the image projected onto the vehicle windshield does not affect driving of a driver, and thus driving safety is improved.

During actual application, in addition to a case that a size of an area of the image displayed on the vehicle windshield may affect driving safety, whether a layout of the image displayed on the vehicle windshield is consistent with a layout of the user interface of the projection device may also affect driving safety. Thus, the layout of the to-be-detected image may be further detected, so as to determine whether the to-be-detected image is the abnormal image, namely, in a third example, the related information of the target image includes the matching result of each sub-image in the target image and interface design template information corresponding to the sub-image.

Figure 3:
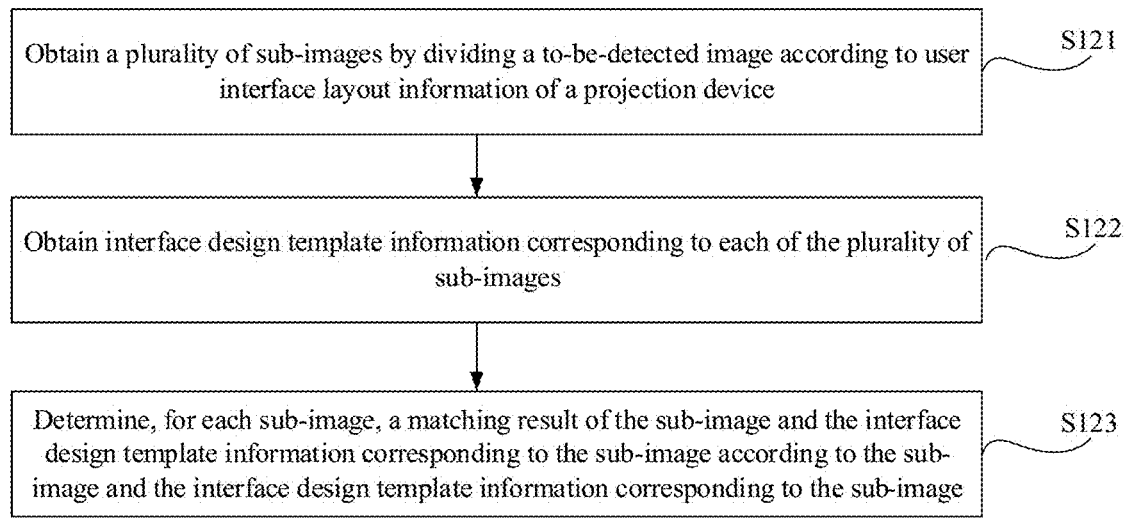
FIG. 3 is a flowchart of a method for determining related information of a target image in a to-be-detected image shown according to an example.

FIG. 3 is a flowchart of a method for determining related information of a target image in a to-be-detected image shown according to an example. As shown in FIG. 3, the method for determining related information of the target image in the to-be-detected image may include the following steps.

In step S121, a plurality of sub-images are obtained by dividing the to-be-detected image according to user interface layout information of the projection device.

Figure 4:
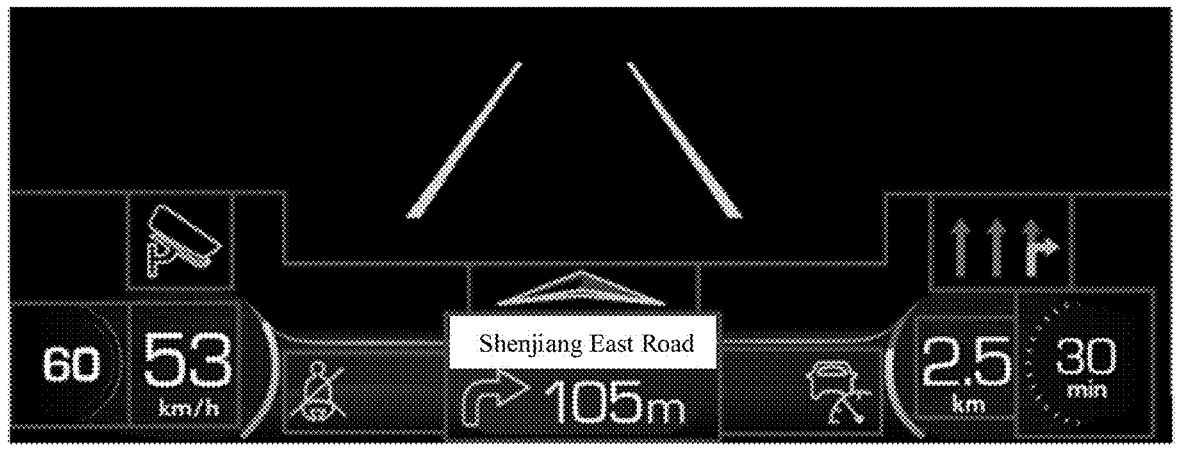
FIG. 4 is a schematic diagram of obtaining sub-images by dividing a to-be-detected image shown according to an example.

As described above, the user interface layout information of the projection device includes a content in each region in the image for display, for example, a region a1 in the image displays an icon which is configured to indicate whether a camera exists on a current road, and a region a2 in the image displays a current speed-limiting numerical value, and the like. Thus, the plurality of sub-images may be obtained by dividing the to-be-detected image according to user interface layout information of the projection device. For example, FIG. 4 is a schematic diagram of obtaining sub-images by dividing a to-be-detected image shown according to an example. Each rectangular block is marked as a sub-image in FIG. 4.

In step S122, interface design template information corresponding to each of the plurality of sub-images is obtained.

The interface design template information is pre-set. Obtaining the interface design template information corresponding to each of the plurality of sub-images includes the following steps:
(1) an interface design template library of each of a plurality of display regions in a user interface of the projection device is obtained, where each interface design template library includes a plurality of pieces of interface design template information.

In the disclosure, the user interface includes the plurality of display regions, each display region has an interface design module library, and each interface design module library includes a plurality of pieces of interface design template information.

It is worth noting that as for one projection device, the display regions of the user interface of the projection device and the interface design template library of each display region usually remain unchanged. Thus, in the disclosure, the interface design template library may be pre-generated, and the interface design template library is obtained and applied when the image needs to be detected, or, the interface design template library is generated during image detection, for example, the interface design template library is generated when the to-be-detected image is obtained, which is not limited by the disclosure.

A way of generating the interface design template library of each display region is described below.

First, the user interface layout information of the projection device is obtained, and the user interface of the projection device is divided according to user interface layout information so as to obtain a plurality of display regions.

In a possible way, by dividing the user interface according to the user interface layout information, the user interface of the projection device may be divided into a dynamic display region, a static display region and an image-free display region, and the plurality of above obtained display regions include the dynamic display region, the static display region and the image-free display region. The dynamic display region is configured to display real-time changing environment information during vehicle driving, for example, an image of a lane line, an image of a vehicle in front, an image of a pedestrian in front, and the like. The static display region is configured to display information displayed in a vehicle dash board and/or a central control screen, for example, the icon configured to indicate whether the camera exists on the current road, the current speed-limiting numerical value, an icon configured to indicate whether a safety belt is tied up, a navigation path icon, a self-adaptive cruise icon, a remaining path distance and an expected driving duration. No image is displayed in the image-free display region.

Figure 5:
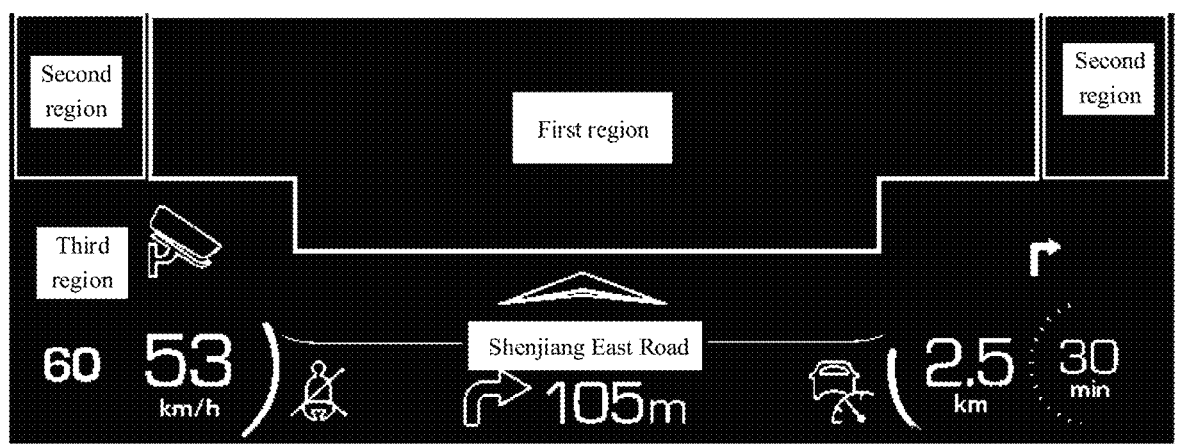
FIG. 5 is a schematic diagram of dividing a user interface shown according to an example.

For example, FIG. 5 is a schematic diagram of dividing a user interface shown according to an example. In FIG. 5, a first region represents the dynamic display region obtained by dividing the user interface, a second region represents the static display region obtained by dividing the user interface, and a third region represents the image-free display region obtained by dividing the user interface. The third region is all regions except the first region and the second region in the user interface.

However, given that no image is displayed in the image-free display region, namely, no interface design template information exists in the interface design template library of this region, so the interface design template library of the image-free display region does not need to be established. Besides, images displayed in the dynamic display region are closely related to a vehicle driving environment and are irregular images, and templates of these images cannot be provided in a design stage of the projection device, the interface design template library of the dynamic display region also does not need to be established.

Accordingly, in another possible way, the user interface layout information includes related information of vehicle driving, which is correspondingly displayed in each display position in the static display region, and the static display region may further be divided into a plurality of display regions displaying the related information of vehicle driving according to the related information of vehicle driving, which is correspondingly displayed in each display position, and the above display region is a display region displaying the related information of vehicle driving. For example, dividing may be performed according to the related information of vehicle driving, which is displayed in the static display region, for example, a region for displaying the icon configured to indicate whether the camera exists on the current road is divided as a display region, a region for displaying the current speed-limiting numerical value is divided as a display region, and the like.

Then, for each display region, a plurality of interface design templates corresponding to the display region are determined, a hash value corresponding to each of the plurality of interface design templates is generated respectively through a hash algorithm, and an interface design template library of the display region is generated according to the hash value corresponding to each of the plurality of interface design templates.

The plurality of interface design templates corresponding to each display region are pre-designed in the design stage of the projection device. For example, for the region for displaying the current speed-limiting numerical value, a plurality of frames of images are pre-designed, a speed-limiting numerical value included in each frame of image is different, and these images are called the interface design template.

According to the above way, the interface design template library of each display region may be generated, and the hash value corresponding to each interface design template included in the interface design template library is the interface design template information.

(2) For each sub-image, an interface design template library of a display region corresponding to the sub-image is determined, and a plurality of pieces of interface design template information included in the interface design template library are determined as the interface design template information corresponding to the sub-image.

In the disclosure, the display region corresponding to each sub-image is determined according to the user interface layout information of the projection device. For example, for the sub-image of the current speed-limiting numerical value shown in FIG. 4, according to the related information of vehicle driving, which is correspondingly displayed in each display region included in the layout information, the display region for displaying the current speed-limiting numerical value is determined, the interface design template library of the display region is determined as an interface design template library of the display region corresponding to the sub-image, and a plurality of pieces of interface design template information included in the interface design template library are determined as interface design template information corresponding to the sub-image.

Returning to FIG. 3, in step S123, for each sub-image, the matching result of the sub-image and the interface design template information corresponding to the sub-image is determined according to the sub-image and the interface design template information corresponding to the sub-image.

In the disclosure, determining the matching result of the sub-image and the interface design template information corresponding to the sub-image is to determine whether interface design template information matching the sub-image exists in the interface design template information corresponding to the sub-image.

For example, a implementation of the above step S123 may be:

a hash value corresponding to the sub-image is generated through a hash algorithm; a plurality of Hamming distances are obtained by calculating a Hamming distance between the hash value corresponding to the sub-image and the hash value corresponding to each interface design template included in the interface design module library; if a Hamming distance less than or equal to a preset threshold exists in the plurality of Hamming distances, the matching result of the sub-image and the interface design template information corresponding to the sub-image is determined as a first result, where the first result is used for representing that the interface design template matching the sub-image exists in the display region; and if each Hamming distance is greater than the preset threshold, the matching result of the sub-image and the interface design template information corresponding to the sub-image is determined as a second result, where the second result is used for representing that no interface design template matching the sub-image exists in the display region.

In the disclosure, it is assumed that the number of interface design templates corresponding to the display region is K, the generated interface design template library of the display region includes K hash values, and a Hamming distance between the hash value corresponding to the sub-image and each hash value included in the interface design template library of the display region is calculated respectively, so as to obtain K Hamming distances. The number of digits of the hash value corresponding to the sub-image is the same as the number of digits of the hash value corresponding to each interface design template.

If the Hamming distance less than or equal to the preset threshold exists in the K Hamming distances, it is considered that the interface design template matching the sub-image exists in the plurality of interface design templates corresponding to the display region, namely, a content displayed by the sub-image is consistent with a content displayed in the display region defined in the user interface layout information of the projection device. If each Hamming distance in the K Hamming distances is greater than the preset threshold, it is determined that the content displayed by the sub-image is inconsistent with the content displayed in the display region defined in the user interface layout information of the projection device, which represents that the to-be-detected image is the abnormal image.

It is to be understood that a way of determining whether the interface design template matching the sub-image exists in the display region is described by taking one sub-image as an example, during actual application, for each sub-image, whether the interface design template matching the sub-image exists in the display region corresponding to the sub-image needs to be determined according to the above way.

Correspondingly, in this example, step S13, a implementation of determining whether the to-be-detected image is the abnormal image according to the related information of the target image is: if a sub-image with the matching result being the second result exists, the to-be-detected image is determined as the abnormal image.

As described above, if the matching result of the sub-image and the interface design template information corresponding to the sub-image is the second result, it shows that the content displayed by the sub-image is inconsistent with the content displayed in the display region defined in the user interface layout information of the projection device, so that if a sub-image with at least one matching result being the second result exists in the plurality of sub-images, the to-be-detected image is determined as the abnormal image.

In a fourth example, the related information of the target image includes the second proportion for which the target image accounts in the to-be-detected image and the matching result of each sub-image in the target image and the interface design template information corresponding to the sub-image, where the second proportion and the matching result of each sub-image and the interface design template information corresponding to the sub-image may be determined according to the above way, which is not repeated in the disclosure.

In this example, in step S13, a implementation of determining whether the to-be-detected image is the abnormal image according to the related information of the target image may be: the to-be-detected image is determined as the abnormal image when the second proportion and the matching result of the sub-image and the interface design template information corresponding to the sub-image do not meet a preset qualification condition, where the qualification condition includes that the second proportion is less than or equal to a preset numerical value, and the matching result of each sub-image and the interface design template information corresponding to the sub-image is a first result, where the first result represents that an interface design template matching the sub-image exists in a display region.

In the disclosure, the to-be-detected image is determined as a normal image in response to determining that the second proportion and the matching result of the sub-image and the interface design template information corresponding to the sub-image meet the above qualification condition, and otherwise, the to-be-detected image is determined as the abnormal image.

Besides, if the to-be-detected image is determined as the abnormal image, an abnormal level of the to-be-detected image may further be determined according to the second proportion and the matching result of the sub-image and the interface design template information corresponding to the sub-image. In an example, in a case that the to-be-detected image is the abnormal image, the abnormal level of the to-be-detected image is determined according to the second proportion and the matching result of the sub-image and the interface design template information corresponding to the sub-image. It is to be understood that the abnormal projection device may also lead to the abnormal to-be-detected image, thus, in another example, the abnormal level of the to-be-detected image may be determined based on the second proportion, the matching result of the sub-image and the interface design template information corresponding to the sub-image and whether the projection device is abnormal.

For example, Table 1 shows a corresponding relationship between the abnormal level of the to-be-detected image as well as the second proportion, the matching result of the sub-image and the interface design template information corresponding to the sub-image and whether the projection device is abnormal, and an abnormal degree represented by the abnormal level is also shown in Table 1.

TABLE 1

| Abnormal level | Abnormal degree | Judgment standard |
| --- | --- | --- |
| Third level | Fatally abnormal | The second proportion is greater than 80%, or the projection device is abnormal |
| Second level | Seriously abnormal | The second proportion is greater than 50% |
| First level | Ordinarily abnormal | The second proportion is greater than 30%, or no interface design template matching the sub-image exists in the plurality of interface design templates corresponding to the display region |

Thus, when the to-be-detected image is determined as the abnormal image, the abnormal level of the to-be-detected image may further be determined, and flexibility of image detection is improved.

Besides, after the abnormal level of the to-be-detected image is determined, a corresponding operation may also be executed, for example, alarm information is outputted so as to warn the driver that the image outputted by the projection device is abnormal, or the projection device is inhibited from enabling, namely, the related information of vehicle driving is not projected and displayed on the vehicle windshield, and the like.

Figure 6:
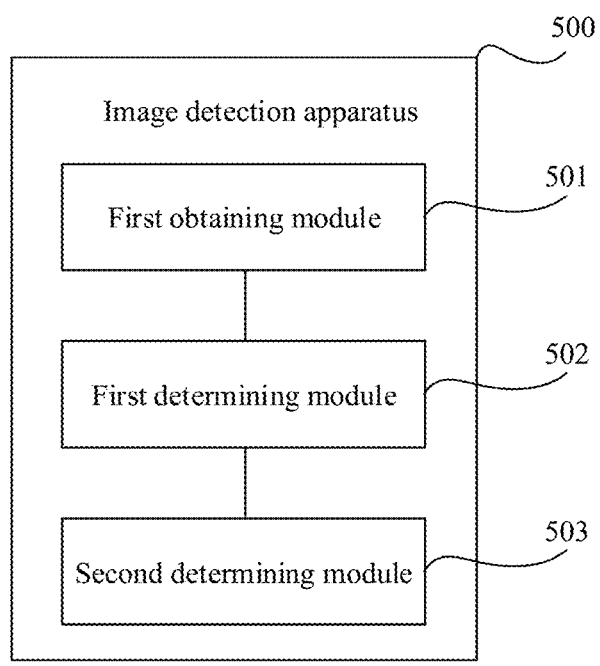
FIG. 6 is a block diagram of an image detection apparatus shown according to an example.

Based on the same inventive concept, the disclosure further provides an image detection apparatus. FIG. 6 is a block diagram of an image detection apparatus shown according to an example. As shown in FIG. 6, the image detection apparatus 500 includes:

a first obtaining module 501, configured to obtain a to-be-detected image;

a first determining module 502, configured to determine related information of a target image in the to-be-detected image, where the target image is an image capable of being projected onto a vehicle windshield for display through a projection device; and a second determining module 503, configured to determine whether the to-be-detected image is an abnormal image according to the related information of the target image.

In some examples, the related information of the target image includes at least one of the following:

a first proportion for which the target image accounts in a non-sketch region of the to-be-detected image, a second proportion for which the target image accounts in the to-be-detected image, and a matching result of each sub-image in the target image and interface design template information corresponding to the sub-image.

In some examples, the target image is an image composed of non-black pixel dots; and in a case that the related information includes the first proportion, the first determining module 502 includes:

a first selecting sub-module, configured to select M first pixel dots in the non-sketch region of the to-be-detected image, where the M first pixel dots are distributed uniformly; and a first determining sub-module, configured to determine the first proportion P1 for which the target image accounts in the non-sketch region of the to-be-detected image in response to determining that a non-black pixel dot exists in the M first pixel dots.

In some examples, in a case that no non-black pixel dot exists in the M first pixel dots and the related information further includes the second proportion, the first determining module 502 further includes:

a second selecting sub-module, configured to select N second pixel dots in a sketch region of the to-be-detected image, where the N second pixel dots are distributed uniformly;

a second determining sub-module, configured to determine the number n of non-black pixel dots in the N second pixel dots; and a third determining sub-module, configured to determine the second proportion P2 for which the target image accounts in the to-be-detected image through the following formula:

$$P2 = n/(M+N)*100\%.$$

In some examples, in a case that the related information includes the matching result of each sub-image in the target image and the interface design template information corresponding to the sub-image, the first determining module 502 includes:

a dividing sub-module, configured to obtain a plurality of sub-images by dividing the to-be-detected image according to user interface layout information of the projection device;

an obtaining sub-module, configured to obtain interface design template information corresponding to each of the plurality of sub-images; and a sixth determining sub-module, configured to determine, for each sub-image, the matching result of the sub-image and the interface design template information corresponding to the sub-image according to the sub-image and the interface design template information corresponding to the sub-image.

In some examples, the obtaining sub-module is configured to:

obtain an interface design template library of each of a plurality of display regions in a user interface of the projection device, where each interface design template library includes a plurality of pieces of interface design template information; and determine, for each sub-image, an interface design template library of a display region corresponding to the sub-image, and determine a plurality of pieces of interface design template information included in the interface design template library as the interface design template information corresponding to the sub-image; where the interface design template library of the display region is generated in the following way:

dividing the user interface of the projection device according to user interface layout information of the projection device so as to obtain a plurality of display regions; and determining, for each display region, a plurality of interface design templates corresponding to the display region, generating a hash value corresponding to each of the plurality of interface design templates respectively through a hash algorithm, and generating an interface design template library of the display region according to the hash value corresponding to each of the plurality of interface design templates.

In some examples, in a case that the related information includes the second proportion and the matching result of each sub-image in the target image and the interface design template information corresponding to the sub-image, the second determining module includes:

a seventh determining sub-module, configured to determine the to-be-detected image as the abnormal image in response to determining that the second proportion and the matching result of the sub-image and the interface design template information corresponding to the sub-image do not meet a preset qualification condition; where the preset qualification condition includes that the second proportion is less than or equal to a preset numerical value, and the matching result of each sub-image and the interface design template information corresponding to the sub-image is a first result, where the first result represents that an interface design template matching the sub-image exists in a display region.

As for the apparatus in the above examples, a mode of each module for executing an operation has been described in detail in the example related to the method, which is not described in detail here.

Figure 7:
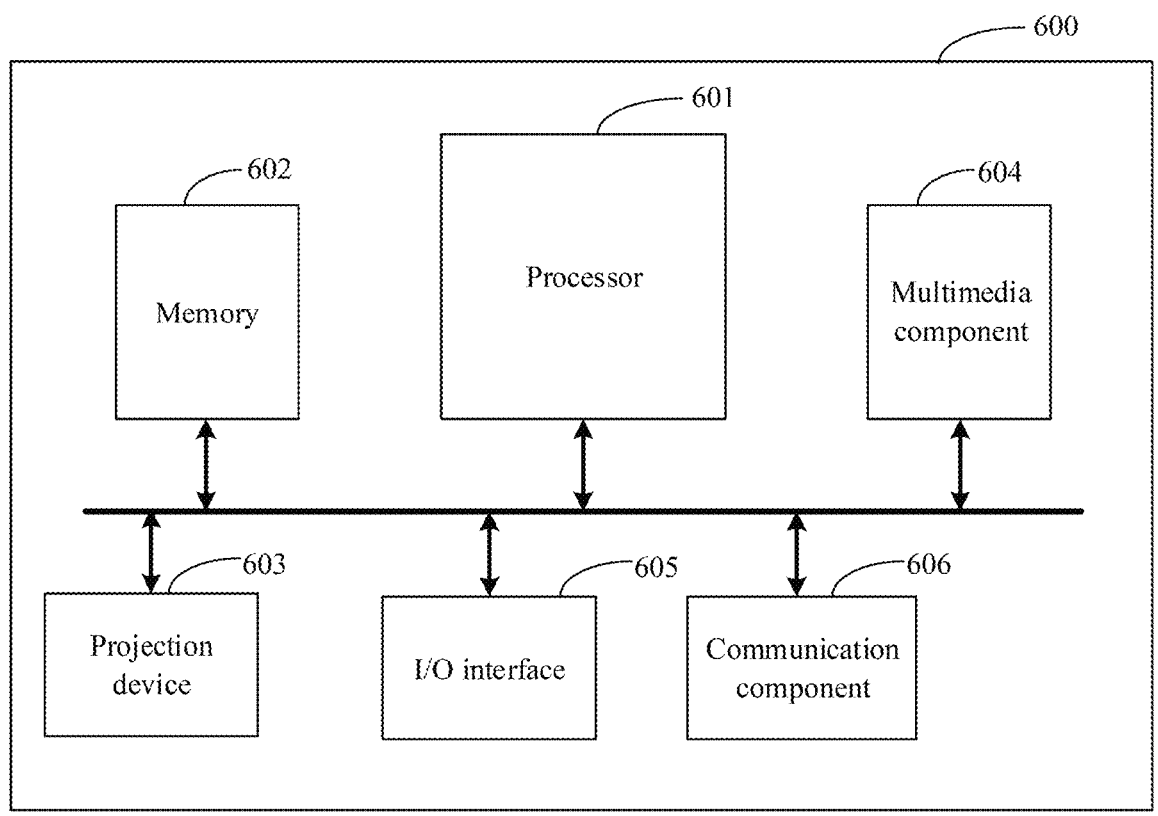
FIG. 7 is a block diagram of a vehicle shown according to an example.

FIG. 7 is a block diagram of a vehicle shown according to an example. As shown in FIG. 7, the vehicle 600 may include: a processor 601, a memory 602 and a projection device 603. The vehicle 600 may further include one or more of a multimedia component 604, an input/output (I/O) interface 605 and a communication component 606.

The projection device 603 may be a head up display (HUD), an augmented reality head up display (AR-HUD), a combiner head up display (C-HUD), a windshield head up display (W-HUD), or the like.

The processor 601 is configured to control whole operations of the vehicle 600, so as to complete all or part of steps in the above image detection method. The memory 602 is configured to store various types of data so as to support operations on the vehicle 600, these data may include, for example, instructions of any application program or method for operation on the vehicle 600 as well as data related to the application program, for example, contact data, received and transmitted messages, pictures, audios, videos and the like. The memory 602 may be implemented by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disc. The multimedia component 604 may include a screen and an audio component. The screen may be, for example, a touch screen. The audio component is configured to output and/or input an audio signal. For example, the audio component may include one microphone which is configured to receive an external audio signal. The received audio signal may be further stored in the memory 602 or sent via the communication component 606. The audio component further includes at least one speaker for outputting the audio signal. The I/O interface 605 provides an interface between the processor 601 and another interface module, and the above another interface module may be a keyboard, a mouse, buttons and the like. These buttons may be virtual buttons or physical buttons. The communication component 606 is configured to perform wired or wireless communication between the vehicle 600 and other devices. The wireless communication includes, for example, Wi-Fi, Bluetooth, a near field communication (NFC), 2G, 3G, 4G, NB-IOT, eMTC, or other 5G, or a combination of one or more of them, which is not limited here. Thus the corresponding communication component 606 may include: a Wi-Fi module, a Bluetooth module, an NFC module and the like.

In an example, the vehicle 600 may be implemented by one or more than one application specific integrated circuit (ASIC), digital signal processor (DSP), digital signal processing device (DSPD), programmable logic device (PLD), field programmable gate array (FPGA), controller, microcontroller, microprocessor or another electronic element for executing the above image detection method.

In another example, a computer-readable storage medium including program instructions is further provided, the program instructions, when executed by a processor, implementing steps of the above image detection method. For example, the computer-readable storage medium may be the above memory 602 including the program instructions, and the above program instructions may be executed by a processor 601 of a vehicle 600 so as to complete the above image detection method.

Figure 8:
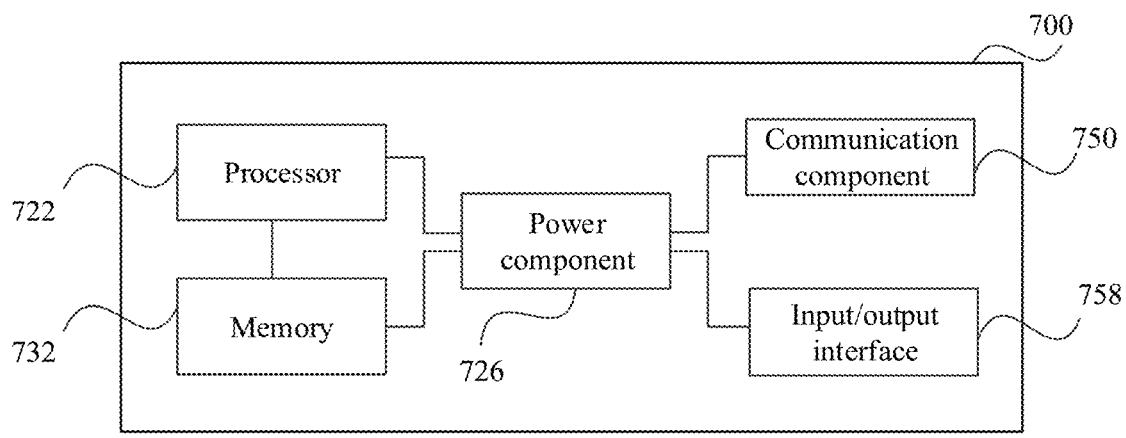
FIG. 8 is a block diagram of an electronic device shown according to an example.

FIG. 8 is a block diagram of an electronic device shown according to an example. For example, the electronic device 700 may be provided as a server. Referring to FIG. 8, the electronic device 700 includes one or more processors 722, and a memory 732 configured to store a computer program executable by the processor 722. The computer program stored in the memory 732 may include one or more than one module each of which corresponds to a set of instructions. Besides, the processor 722 may be configured to execute the computer program so as to execute the above image detection method.

Besides, the electronic device 700 may further include a power component 726 and a communication component 750, the power component 726 may be configured to execute power management of the electronic device 700, and the communication component 750 may be configured to implement communication of the electronic device 700, for example, wired or wireless communication. Besides, the electronic device 700 may further include an input/output (I/O) interface 758. The electronic device 700 may operate an operating system stored in the memory 732, for example, Windows Server™, Mac OS X™, Unix™, Linux™ and the like.

In another example, a non-transitory computer-readable storage medium including program instructions is further provided, the program instructions, when executed by a processor, implementing steps of the above image detection method. For example, the non-transitory computer-readable storage medium may be the above memory 732 including the program instructions, and the above program instructions may be executed by a processor 722 of an electronic device 700 so as to complete the above image detection method.

In another example, a computer program product is further provided, the computer program product includes a computer program capable of being executed by a programmable apparatus, and the computer program has a code part which is used for executing, when executed by the programmable apparatus, the above image detection method.

Preferred implementations of the disclosure are described in detail above with reference to the accompanying drawings, however, the disclosure is not limited to the details in the above implementations. Various simple variations may be made for the technical solutions of the disclosure within the scope of the technical concept of the disclosure, and these simple variations fall within the protection scope of the disclosure.

It needs to be additionally noted that the various technical features described in the above implementations may be combined in any suitable mode without contradiction. In order to avoid unnecessary repetitions, various possible combinations are omitted in the disclosure.

In addition, various different implementations of the disclosure may also be combined in any way without violating the concept of the disclosure, which are also regarded as the contents disclosed by the disclosure.

The invention claimed is:

1. An image detection method, comprising:
obtaining a to-be-detected image;
determining related information of a target image in the to-be-detected image, wherein the target image is an image capable of being projected onto a vehicle windshield for display through a projection device; and
determining whether the to-be-detected image is an abnormal image according to the related information of the target image;
wherein the related information of the target image comprises at least one of the following:
a first proportion for which the target image accounts in a non-sketch region of the to-be-detected image, a second proportion for which the target image accounts in the to-be-detected image, and a matching result of each sub-image in the target image and interface design template information corresponding to the sub-image.

2. The method according to claim 1, wherein
the target image is an image composed of non-black pixel dots; and
in a case that the related information comprises the first proportion, determining the related information of the target image in the to-be-detected image comprises:
selecting M first pixel dots in the non-sketch region of the to-be-detected image, wherein the M first pixel dots are distributed uniformly; and
determining the first proportion P1 for which the target image accounts in the non-sketch region of the to-be-detected image in response to determining that a non-black pixel dot exists in the M first pixel dots.

3. The method according to claim 2, wherein
in a case that no non-black pixel dot exists in the M first pixel dots and the related information further comprises the second proportion, determining the related information of the target image in the to-be-detected image further comprises:
selecting N second pixel dots in a sketch region of the to-be-detected image, wherein the N second pixel dots are distributed uniformly;
determining the number n of non-black pixel dots in the N second pixel dots; and
determining the second proportion P2 for which the target image accounts in the to-be-detected image through the following formula: P2=n/(M+N)*100%.

4. The method according to claim 1, wherein
in a case that the related information comprises the matching result of each sub-image in the target image and the interface design template information corresponding to the sub-image, determining the related information of the target image in the to-be-detected image comprises:
obtaining a plurality of sub-images by dividing the to-be-detected image according to user interface layout information of the projection device;
obtaining interface design template information corresponding to each of the plurality of sub-images; and
determining, for each sub-image, the matching result of the sub-image and the interface design template information corresponding to the sub-image according to the sub-image and the interface design template information corresponding to the sub-image.

5. The method according to claim 4, wherein obtaining interface design template information corresponding to each of the plurality of sub-images comprises:
obtaining an interface design template library of each of a plurality of display regions in a user interface of the projection device, wherein each interface design template library comprises a plurality of pieces of interface design template information; and
determining, for each sub-image, an interface design template library of a display region corresponding to the sub-image, and determining a plurality of pieces of interface design template information comprised in the interface design template library as the interface design template information corresponding to the sub-image; wherein
the interface design template library of the display region is generated in the following way:
dividing the user interface of the projection device according to user interface layout information of the projection device so as to obtain a plurality of display regions; and
determining, for each display region, a plurality of interface design templates corresponding to the display region, generating a hash value corresponding to each of the plurality of interface design templates respectively through a hash algorithm, and generating an interface design template library of the display region according to the hash value corresponding to each of the plurality of interface design templates.

6. The method according to claim 1, wherein
in a case that the related information comprises the second proportion and the matching result of each sub-image in the target image and the interface design template information corresponding to the sub-image, determining whether the to-be-detected image is the abnormal image according to the related information of the target image comprises:
determining that the to-be-detected image is the abnormal image in response to determining that the second proportion and the matching result of the sub-image and the interface design template information corresponding to the sub-image do not meet a preset qualification condition; wherein
the preset qualification condition comprises that the second proportion is less than or equal to a preset numerical value, and the matching result of each sub-image and the interface design template information corresponding to the sub-image is a first result, wherein the first result represents that an interface design template matching the sub-image exists in a display region.

7. A non-transitory computer-readable storage medium, storing a computer program, wherein when the computer program are executed by a processor, the processor is caused to:
obtain a to-be-detected image;
determine related information of a target image in the to-be-detected image, wherein the target image is an image capable of being projected onto a vehicle windshield for display through a projection device; and
determine whether the to-be-detected image is an abnormal image according to the related information of the target image;
wherein, the related information of the target image comprises at least one of the following:
a first proportion for which the target image accounts in a non-sketch region of the to-be-detected image, a second proportion for which the target image accounts in the to-be-detected image, and a matching result of each sub-image in the target image and interface design template information corresponding to the sub-image.

8. The non-transitory computer-readable storage medium according to claim 7, storing a computer program, wherein, the target image is an image composed of non-black pixel dots; and in a case that the related information comprises the first proportion, when the computer program are executed by a processor, the processor is further caused to:
select M first pixel dots in the non-sketch region of the to-be-detected image, wherein the M first pixel dots are distributed uniformly; and
determine the first proportion P1 for which the target image accounts in the non-sketch region of the to-be-detected image in response to determining that a non-black pixel dot exists in the M first pixel dots.

9. The non-transitory computer-readable storage medium according to claim 8, storing a computer program, wherein, in a case that no non-black pixel dot exists in the M first pixel dots and the related information further comprises the second proportion, the processor is further caused to:

select N second pixel dots in a sketch region of the to-be-detected image, wherein the N second pixel dots are distributed uniformly;

determine the number n of non-black pixel dots in the N second pixel dots; and determine the second proportion P2 for which the target image accounts in the to-be-detected image through the following formula: P2=n/(M+N)*100%.

10. The non-transitory computer-readable storage medium according to claim 7, storing a computer program, wherein, in a case that the related information comprises the matching result of each sub-image in the target image and the interface design template information corresponding to the sub-image, the processor is further caused to:

obtain a plurality of sub-images by dividing the to-be-detected image according to user interface layout information of the projection device;

obtain interface design template information corresponding to each of the plurality of sub-images; and determine, for each sub-image, the matching result of the sub-image and the interface design template information corresponding to the sub-image according to the sub-image and the interface design template information corresponding to the sub-image.

11. The non-transitory computer-readable storage medium according to claim 10, storing a computer program, wherein, the processor is further caused to:

obtain an interface design template library of each of a plurality of display regions in a user interface of the projection device, wherein each interface design template library comprises a plurality of pieces of interface design template information; and determine, for each sub-image, an interface design template library of a display region corresponding to the sub-image, and determining a plurality of pieces of interface design template information comprised in the interface design template library as the interface design template information corresponding to the sub-image; wherein the interface design template library of the display region is generated in the following way:

dividing the user interface of the projection device according to user interface layout information of the projection device so as to obtain a plurality of display regions; and determining, for each display region, a plurality of interface design templates corresponding to the display region, generating a hash value corresponding to each of the plurality of interface design templates respectively through a hash algorithm, and generating an interface design template library of the display region according to the hash value corresponding to each of the plurality of interface design templates.

12. The non-transitory computer-readable storage medium according to claim 7, storing a computer program, wherein, in a case that the related information comprises the second proportion and the matching result of each sub-image in the target image and the interface design template information corresponding to the sub-image, the processor is further caused to:

determine that the to-be-detected image is the abnormal image in response to determining that the second proportion and the matching result of the sub-image and the interface design template information corresponding to the sub-image do not meet a preset qualification condition; wherein the preset qualification condition comprises that the second proportion is less than or equal to a preset numerical value, and the matching result of each sub-image and the interface design template information corresponding to the sub-image is a first result, wherein the first result represents that an interface design template matching the sub-image exists in a display region.

13. A vehicle, comprising:

a projection device, configured to project a to-be-detected image onto a vehicle windshield;

a processor;

a memory for storing executable instructions of the processor; wherein the processor is configured to:

obtain a to-be-detected image;

determine related information of a target image in the to-be-detected image, wherein the target image is an image capable of being projected onto a vehicle windshield for display through a projection device; and determine whether the to-be-detected image is an abnormal image according to the related information of the target image;

wherein the related information of the target image comprises at least one of the following: a first proportion for which the target image accounts in a non-sketch region of the to-be-detected image, a second proportion for which the target image accounts in the to-be-detected image, and a matching result of each sub-image in the target image and interface design template information corresponding to the sub-image.

14. The vehicle according to claim 13, wherein the target image is an image composed of non-black pixel dots; and in a case that the related information comprises the first proportion, the processor is further configured to:

select M first pixel dots in the non-sketch region of the to-be-detected image, wherein the M first pixel dots are distributed uniformly; and determine the first proportion P1 for which the target image accounts in the non-sketch region of the to-be-detected image in response to determining that a non-black pixel dot exists in the M first pixel dots.

15. The vehicle according to claim 14, wherein in a case that no non-black pixel dot exists in the M first pixel dots and the related information further comprises the second proportion, the processor is further configured to:

select N second pixel dots in a sketch region of the to-be-detected image, wherein the N second pixel dots are distributed uniformly;

determining the number n of non-black pixel dots in the N second pixel dots; and determine the second proportion P2 for which the target image accounts in the to-be-detected image through the following formula: P2=n/(M+N)*100%.

16. The vehicle according to claim 13, wherein in a case that the related information comprises the matching result of each sub-image in the target image and the interface design template information corresponding to the sub-image, the processor is further configured to:

obtain a plurality of sub-images by dividing the to-be-detected image according to user interface layout information of the projection device;

obtain interface design template information corresponding to each of the plurality of sub-images; and determine, for each sub-image, the matching result of the sub-image and the interface design template information corresponding to the sub-image according to the sub-image and the interface design template information corresponding to the sub-image.

17. The vehicle according to claim 16, wherein the processor is further configured to:

obtain an interface design template library of each of a plurality of display regions in a user interface of the projection device, wherein each interface design template library comprises a plurality of pieces of interface design template information; and determine, for each sub-image, an interface design template library of a display region corresponding to the sub-image, and determining a plurality of pieces of interface design template information comprised in the interface design template library as the interface design template information corresponding to the sub-image; wherein the interface design template library of the display region is generated in the following way:

dividing the user interface of the projection device according to user interface layout information of the projection device so as to obtain a plurality of display regions; and determining, for each display region, a plurality of interface design templates corresponding to the display region, generating a hash value corresponding to each of the plurality of interface design templates respectively through a hash algorithm, and generating an interface design template library of the display region according to the hash value corresponding to each of the plurality of interface design templates.

\* \* \* \* \*